US011547887B2

(12) United States Patent
Melton

(10) Patent No.: US 11,547,887 B2
(45) Date of Patent: Jan. 10, 2023

(54) VALVES FOR FIRE SUPPRESSION SYSTEMS

(71) Applicant: Firetrace Ltd., Ipswich (GB)

(72) Inventor: David L. Melton, Suffolk (GB)

(73) Assignee: Firetrace Ltd., Ipswich (GB)

(*) Notice: Subject to any disclaimer, the term of this patent is extended or adjusted under 35 U.S.C. 154(b) by 135 days.

(21) Appl. No.: 16/885,484

(22) Filed: May 28, 2020

(65) Prior Publication Data
US 2020/0406078 A1 Dec. 31, 2020

(30) Foreign Application Priority Data

May 30, 2019 (GB) ...................................... 1907680

(51) Int. Cl.
A62C 35/68 (2006.01)
A62C 35/64 (2006.01)
F16K 17/02 (2006.01)

(52) U.S. Cl.
CPC ............ *A62C 35/68* (2013.01); *A62C 35/645* (2013.01); *F16K 17/02* (2013.01)

(58) Field of Classification Search
CPC ......... A62C 35/02; A62C 35/11; A62C 35/13; A62C 35/58; A62C 35/64; A62C 35/645; A62C 35/68; A62C 37/08; A62C 37/11; A62C 37/12; F16K 17/02; F16K 31/363; F16K 31/383
See application file for complete search history.

(56) References Cited

U.S. PATENT DOCUMENTS 3,860,073 A * 1/1975 Willms ................. F16K 31/383
251/43
5,575,338 A 11/1996 Sundholm
5,653,291 A 8/1997 Sundholm
5,954,138 A * 9/1999 Gabriel .................. A62C 35/68
137/72

(Continued)

FOREIGN PATENT DOCUMENTS

GB 2439338 A 12/2007

OTHER PUBLICATIONS

UK Search Report from GB 1907680.1; 3 pages; David McWhirter; dated Dec. 2, 2019.

*Primary Examiner* — Darren W Gorman
(74) *Attorney, Agent, or Firm* — Dicke, Billig & Czaja, PLLC

(57) ABSTRACT

A valve comprises a housing having a main inlet, a detection port and an outlet, each providing a channel extending from an exterior of the valve into a hollow interior defined in part by the housing. The inlet is arranged, in use, to be in fluid communication with the interior of a pressurised cylinder of extinguishant fluid. The detection port is arranged, in use, to be in fluid communication with a fire detection system. The valve has two valve parts which are relatively movable between a first position, a second position and a third position. In the first position, a face seal prevents communication between the high pressure chamber and the low pressure chamber, in the second position, the face seal is in an unsealed position and allows communication between the high pressure chamber and the low pressure chamber, and in the third position, the face seal prevents communication between the high pressure chamber and the low pressure chamber.

20 Claims, 10 Drawing Sheets

(56) References Cited

U.S. PATENT DOCUMENTS

| | | | | |
|---|---|---|---|---|
| 6,708,772 B2* | 3/2004 | Bermes | ................ | F16K 31/383 |
| | | | | 169/22 |
| 8,561,711 B2* | 10/2013 | Karalis | ................ | A62C 37/46 |
| | | | | 169/46 |
| 9,072,925 B2* | 7/2015 | Bermes | ................ | A62C 35/68 |
| 2016/0339282 A1* | 11/2016 | Melton | ................ | A62C 35/68 |

* cited by examiner

VALVES FOR FIRE SUPPRESSION SYSTEMS

FIELD OF THE INVENTION

The present invention relates to a control valve for a fire suppression system and a method of actuating a fire suppression system.

BACKGROUND TO THE INVENTION

Fire extinguishing systems often use a pressurised extinguishant fluid, such as compressed gas, which is released in the vicinity of a fire. In some automatic fire suppression systems, a cylinder filled with compressed gas is connected to a length of fusible fire detection tubing. The walls of the pressurised detection tubing are arranged to rupture when heated, such that extinguishant gas is released at the point of rupture, close to the fire or source of heat. Such systems may be installed in areas where fire presents a significant hazard, such that fires can be detected and extinguished automatically. For example, these systems may be installed in industrial machinery, electrical panels and devices, vehicles, and laboratory equipment. Carbon dioxide is often used as a extinguishant gas, since it is relatively inexpensive, safe, and can be recaptured from industrial processes.

In some systems, a valve between the cylinder and the detection tubing is used to control release of extinguishant from the cylinder. The valve is controlled by a pressure differential between the cylinder and the detection tubing. Ordinarily, the pressure in the detection tubing keeps the valve closed, whilst a drop in pressure following rupture of the tubing triggers opening of the valve and release of extinguishant from the cylinder. Extinguishant may be discharged via the detection tubing and/or via another outlet connected to the valve. The use of a valve allows the pressure in the pressurised cylinder to be significantly greater than the pressure in the detection tubing. In this way, a larger volume of extinguishant can be released when the system is triggered, without the need to maintain high pressure in the detection tubing for extended periods of time.

The pressure in the detection tubing must be maintained in order for the tubing to function effectively as a trigger. Gradual loss of pressure from the tubing, for example through leakage, may lead to depletion of extinguishant from the cylinder, whilst excessive pressure may rupture the tubing even in the absence of fire. To this end, in some systems the valve is equipped with a replenishment mechanism, which allows gradual flow of relatively small amounts of extinguishant gas from the cylinder into the detection tubing, to maintain pressure in the tubing. Such a valve is the subject of the current applicant's granted UK patent No. GB2439338.

Valves used to control pressurised gas often include O-rings for forming seals between moving parts of the valve. However, deformation of O-rings under pressure can increase the force required to move parts of a valve, or result in parts becoming jammed. O-ring deformation may therefore reduce the accuracy of actuation of a valve, or result in failure of a valve. O-rings may deform under relatively high load, or, for example, when exposed to pressurised carbon dioxide, O-rings may become saturated and subsequently swell. Also, where a space is sealed between two or more O-rings on the same moving part, a large difference between the external pressure and the pressure in the space may cause jamming of the part.

Gases stored under pressure may be mostly in the liquid phase. Another problem associated with the control of pressurised fluids occurs when compressed gas in the liquid phase, rather than the gaseous phase, passes through a valve or other control mechanism to a region of lower pressure. When liquefied gas changes phase upon entering a region of lower pressure, it expands considerably, leading to an increase in pressure. However, because this phase change is not instantaneous, there is a lag between opening of the valve and the subsequent increase in pressure downstream of the valve. Precise control of pressure may therefore be difficult to achieve, and undesirable large increases in pressure may result from brief actuation of the valve.

It is an object of the present invention to overcome at least one problem associated with the prior art, whether referred to herein or otherwise.

SUMMARY OF THE INVENTION

According to a first aspect of the present invention there is provided a valve having a body with a high pressure chamber with a high pressure inlet port, a high pressure outlet port, a valve member movable within the body for opening and closing communication between the inlet and outlet ports and a low pressure chamber with a low pressure port for connection to a low pressure reservoir, wherein the pressure in the low pressure reservoir determines whether communication is opened between the inlet and outlet ports and wherein the valve member has two valve parts which are movable relative to one another, a first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which:

the valve comprises a face seal located between the high pressure chamber and the low pressure reservoir and, in which, in the first positon, the face seal is arranged to seal the low pressure reservoir from the high pressure chamber and, in the second position, the face seal is in an unsealed position and enables communication between the high pressure chamber and the low pressure reservoir.

Preferably the face seal is mounted to the first valve part and preferably on an end face of the first valve part. The first valve part may have a first face seal mounted on a first end face and a second face seal mounted on a second end face.

Preferably the or each face seal is arranged to create a seal between two sealing surfaces and wherein the sealing surfaces are arranged to move (directly) towards each other and away from each other to open and close a pathway defined therebetween. Preferably the separation distance between the two sealing surfaces is arranged to increase to create an open passageway and may be arranged to move towards each other to (resiliently) compress the face seal therebetween to close the passageway.

The face seal may be located between a face of the first valve part and a face of the second valve part. Preferably the sealing face(s) of the first valve part and the second valve part are (directly) movable away from and towards each other between the unsealed position and the sealed position.

In the first position, the face seal may prevent communication between the high pressure chamber and the low pressure chamber. In the second position, the face seal may be in an unsealed position and allows communication between the high pressure chamber and the low pressure chamber. In the third position, the face seal may prevent communication between the high pressure chamber and the low pressure chamber.

Preferably the face seal is located on (and/or mounted) to a first end face of the first valve part.

Preferably the face seal seals an entry to the low pressure reservoir in the first position (and/or third position). Preferably the face seal unseals (opens) the entry to the low pressure reservoir from the high pressure chamber in the second position.

The face seal may be located on a first (distal) end face of the first valve part and may comprises a planar annular seal member.

The valve may comprise a first face seal and a second face seal.

Preferably the valve comprises a second face seal located on the first valve part and wherein, in the first position, the second face seal may be located between a second (end/proximal end) face of the first valve part and a face located adjacent to the high pressure chamber which may prevent fluid flow between the inlet port and the outlet port. Preferably, in the first positon, the second face seal prevents communication between the high pressure inlet port and the outlet port.

Preferably the second face seal is located between a second (end) face of the first valve part and a (sealing) face located adjacent to the high pressure chamber.

In the first position, the second face seal may prevent communication between the inlet port and the outlet port. In the second position, the second face seal may prevent communication between the inlet port and the outlet port. In the third position, the second face seal may be in an unsealed position and allows communication between the inlet port and the outlet port.

The second face seal may be located on a second (proximal) end face of the first valve part and may comprises a planar annular seal member.

Preferably, in the first position, the second face seal is resiliently compressed between a second end face of the first valve part and a sealing face provided by the high pressure chamber. The sealing face provided by the high pressure chamber may comprise an annular sealing face which may be located around the high pressure chamber.

Preferably, in the second positon, the second face seal is located between a face of the first valve part and a face located adjacent to the high pressure chamber to prevent communication between the inlet port and the outlet port.

Preferably, in the second position, the second face seal is resiliently compressed between a second end face of the first valve part and a sealing face provided by the high pressure chamber.

Preferably, in the third position, the second face seal is located remote from the sealing face of the high pressure chamber and opens/exposes the high pressure outlet port which may enable unrestricted flow from the high pressure inlet to the high pressure outlet.

Preferably, in the third position, the second face seal is in an unsealing positon and enables an unrestricted communication (fluid flow) between the high pressure inlet port and the high pressure outlet port.

Preferably the second face seal seals an entry to the high pressure outlet port in the first position (and/or second position). Preferably the second face seal unseals (opens) the entry to the high pressure outlet in the third position.

Preferably the second face seal is located on a second end face of the first valve part.

Preferably, in the first position, the (first) face seal is located and/or resiliently compressed between a first end face of the first valve part and a first face of the second valve part. The sealing face may comprises an annular (or circular) sealing face which may be located around a regulating chamber.

Preferably, in the second positon, the (first) face seal is located remote from the first face of the second part and opens/exposes a bleed passageway between the regulating chamber and the low pressure reservoir which may enable restricted flow from the high pressure chamber to the low pressure reservoir.

Preferably, in the second position, the (first) face seal is in an unsealing positon and enables a restricted communication (fluid flow) between the high pressure inlet port and the low pressure reservoir.

Preferably the second valve part comprises a bleed passageway to enable communication between the high pressure chamber and the low pressure reservoir in the second position. Preferably the (first) face seal seals an entry to the bleed passageway in the first position. Preferably the (first) face seal unseals (opens) the entry to the bleed passageway in the second position.

Preferably the first valve part comprises a restricted passageway therethrough. The first valve part may comprise a filter member located within the restricted passageway. The filter member may comprise a sintered filter.

Preferably, in the third position, the (first) face seal is located and/or resiliently compressed between a first end face of the first valve part and a first face of the second valve part. Preferably, in the third position, the (first) face seal prevents (restricted) communication between the high pressure inlet port and the low pressure reservoir.

The valve may comprise a pressure relief system to release excess pressure from the low pressure reservoir. The pressure relief system may comprise a passageway which may provide communication between the low pressure reservoir and the external atmosphere and the passageway may be defined in the second valve part and may comprise an entry region, a passageway and an exit region.

The valve may comprise a bypass conduit which may extend between the high pressure outlet port and the low pressure port.

The body may have two cylinder portions of differing diameters, the first valve part of the valve member is in the form of a piston having a small diameter portion working in the smaller diameter cylinder and the second valve part of the valve member is also in the form of a piston, with a large diameter portion working in the large diameter cylinder.

Preferably the second valve part of the valve member has a (blind) bore, and an end (or shank) of the first valve part slides in the bore.

Preferably a gas-tight seal exists in the bore when the first and second valve parts are in the first position and, in the second position, the second valve part moves away from a distal (first) end of the first valve part in the bore to allow a restricted passageway to open between the high pressure inlet port and the low pressure chamber.

Preferably the gas-tight seal is formed by the (first) face seal on the distal end of the first valve part and an inner end face of the second valve part, and the restricted passageway takes the form of a passageway through the second valve part which may have an entry region defined on an inner surface of the bore portion of the second valve part which, in the first position, is covered/sealed by the (first) face seal.

Preferably the restricted passageway includes a radial passageway in the second valve part communicating with the low pressure reservoir.

According to a first aspect of the present invention there is provided a fire suppression system comprising a cylinder containing a high pressure extinguishant, a detection tube defining a low pressure reservoir and a control valve, the control valve having a body with a high pressure chamber with a high pressure inlet port engaged to the cylinder, a high pressure outlet port, a valve member movable within the body for opening and closing communication between the inlet and outlet ports and a low pressure chamber with a low pressure port engaged to the detection tube, wherein the pressure in the low pressure reservoir determines whether communication is opened between the inlet and outlet ports and wherein the valve member has two valve parts which are movable relative to one another, a first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which:

the valve comprises a face seal located between the high pressure chamber and the low pressure reservoir and, in which, in the first positon, the face seal is arranged to seal the low pressure reservoir from the high pressure chamber and, in the second position, the face seal is in an unsealed position and enables communication between the high pressure chamber and the low pressure reservoir.

According to a third aspect of the present invention there is provided a method of actuating a fire suppression system wherein the fire suppression system comprises comprising a cylinder containing a high pressure extinguishant, a detection tube defining a low pressure reservoir and a control valve, the valve having a body with a high pressure chamber with a high pressure inlet port, a high pressure outlet port, a valve member movable within the body for opening and closing communication between the inlet and outlet ports and a low pressure chamber with a low pressure port for connection to a low pressure reservoir, wherein the pressure in the low pressure reservoir determines whether communication is opened between the inlet and outlet ports and wherein the valve member has two valve parts which are movable relative to one another, a first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which the method comprises:

providing a face seal for sealing the high pressure chamber from the low pressure chamber and, in the first positon, sealing the low pressure reservoir from the high pressure chamber using the face seal and, moving the valve parts to the second position to move the face seal to an unsealed position to enable communication between the high pressure chamber and the low pressure reservoir.

BRIEF DESCRIPTION OF THE DRAWINGS

The present invention will now be described, by way of example only, with reference to the drawings that follow, in which.

DESCRIPTION OF THE PREFERRED EMBODIMENTS

Figure 1:
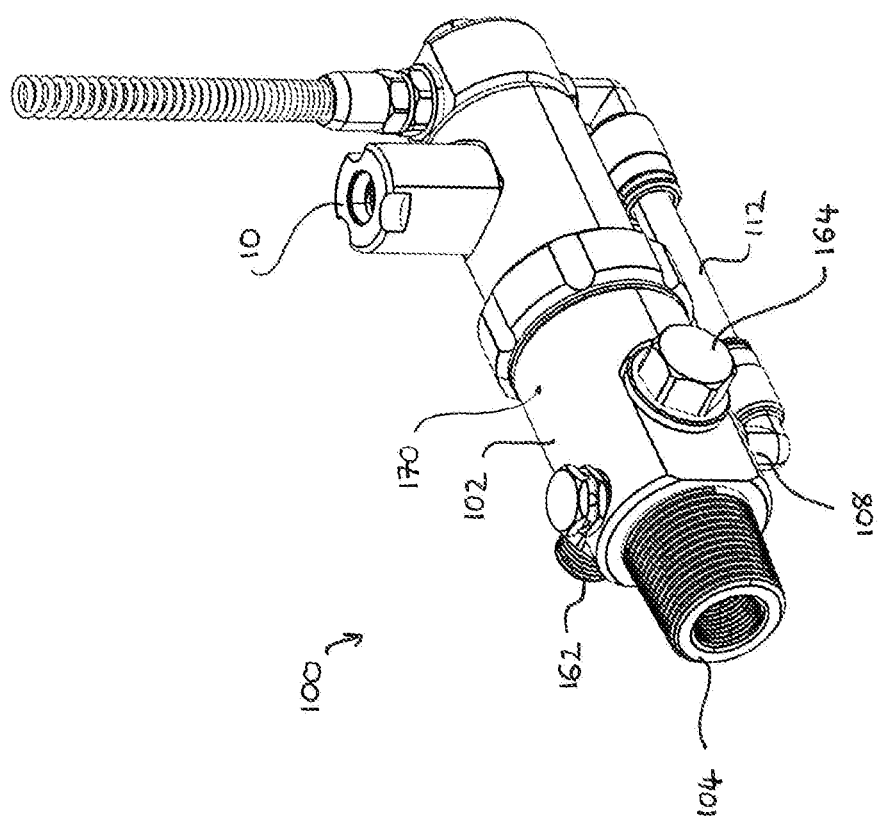
FIG. 1 is a perspective view of a preferred embodiment of a control valve for a fire suppression system.

FIG. 1 to FIG. 7 show a valve 100 according to a first embodiment of the invention, together with an isolation valve 10 to which the valve may be connected. The isolation valve 10 is a ball valve of the kind described in the present applicant's granted UK patent No. GB 2 512 485, and will not be described in detail here.

As can be seen in FIGS. 1 to 5, the valve 100 comprises a housing 102 (a body) having a main inlet 104, a detection port 106 and an outlet 108. The inlet 104, detection port 106 and outlet 108 each provide a channel extending from an exterior of the valve into a hollow interior 110 defined in part by the housing 102. The inlet 104 is arranged, in use, to be connected to a source of pressurised extinguishant fluid. In this embodiment, the inlet is arranged to be in fluid communication with the interior of a pressurised cylinder 14. The detection port 106 is arranged, in use, to be in fluid communication with a fire detection system. Specifically, the detection port is arranged to be in communication with a length of fusible fire detection tubing 12 forming part of a fire suppression system of a kind well known in the art.

In this first embodiment, the detection port 106 is shown connected to the fire detection tubing 12 via the isolation valve 10. The detection port 106 is coupled to an inlet of the isolation valve 10. The detection tubing 12 is connected to an outlet of the isolation valve 10. In this way, the isolation valve 10 provides a fluid passageway between the detection port 106 and the detection tubing 12. The isolation valve 10 may be operated to close the passageway between the detection port 106 and the detection tubing 12.

The outlet 108 is arranged to be connected to a discharge tube of a fire suppression or fire extinguishing system. In this embodiment, the outlet is connected to the same length of fusible tubing 12 as the detection port 106, where the tubing 12 serves as both the detection tubing and discharge tube, as described above. The outlet 108 is connected to the detection tubing 12 via a bypass tube 112. The bypass tube 112 provides fluid communication between the outlet 108 and the detection tubing 12.

In use, the valve 100 is arranged such that a pressure in the detection tube 12 controls the opening of the valve, as will be described in more detail below. The detection tube 12 provides/contains or defines a low pressure reservoir. The pressure in the detection tube 12 controls the opening of a passageway between the pressurised cylinder 14 and the outlet 108. More specifically, the valve 100 is arranged such that when the detection tube 12 ruptures in response to heat, the drop in pressure in the detection tube 12 triggers the opening of the valve 100 in order to release extinguishant from the cylinder 14 or other source of extinguishant. The pressure in the detection tube 12 also controls the opening of a passageway between the cylinder 14 and the detection tubing 12.

Figure 2:
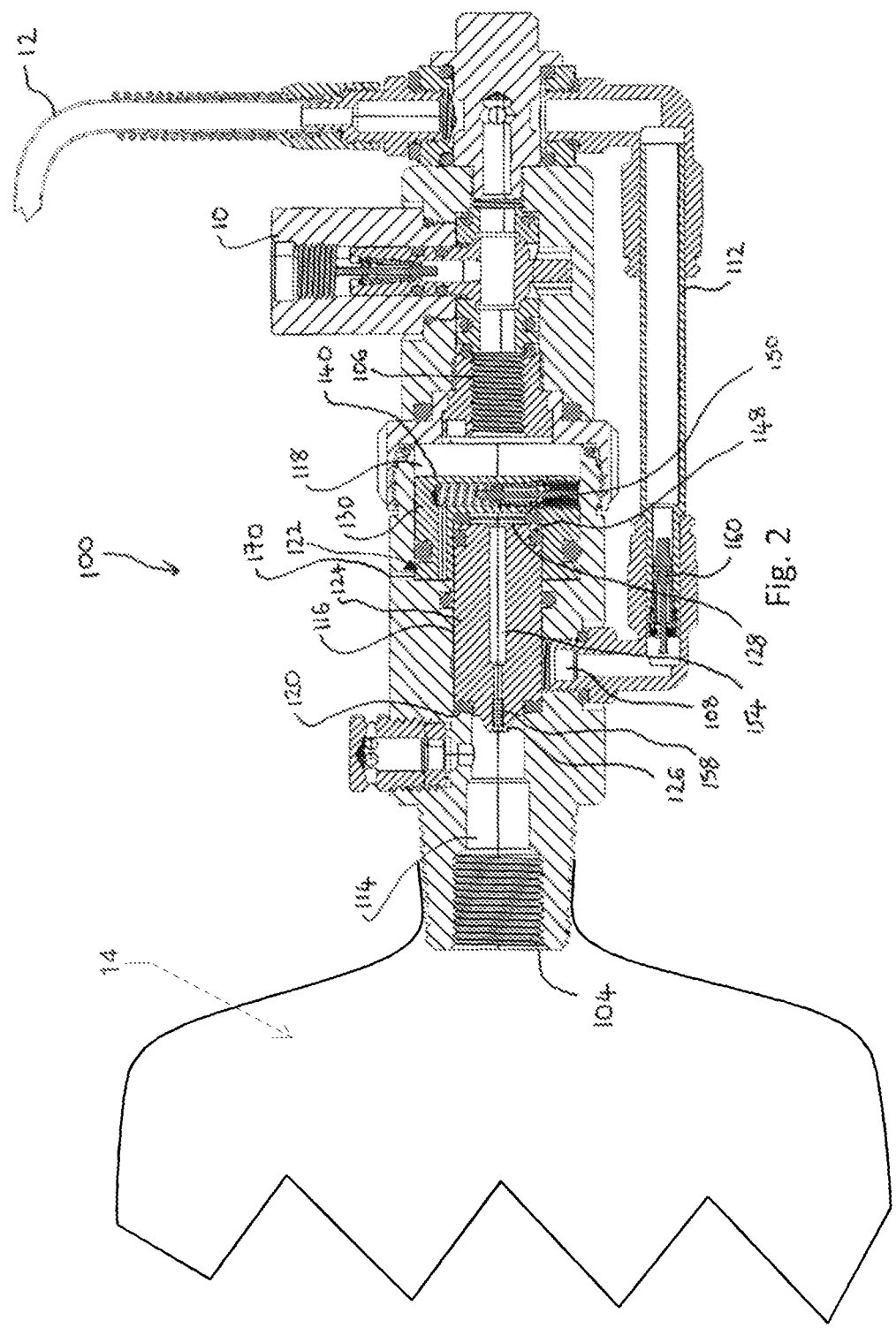
FIG. 2 is a side cross section of a preferred embodiment of a control valve for a fire suppression system in a first positon.

The valve housing 102 is generally cylindrical, with the inlet 104 and detection port 106 disposed at opposite ends of the housing 102. As shown in FIG. 2, the hollow interior 110 of the valve comprises a continuous cylindrical bore extending between the inlet 104 and the detection port 106. The bore comprises a high pressure chamber 114, a middle chamber 116, and a low pressure chamber 118. In this specification, references to high pressure and low pressure are relative only and do not refer to any specific values of pressure.

The high pressure chamber 114 extends from the inlet 104 towards the detection port 106. The low pressure chamber 118 extends from the detection port 106 towards the inlet 104. The middle chamber 116 extends between the low pressure and high pressure chambers (118, 114). In this way the middle chamber 116 provides a passageway between the high pressure chamber 114 and the low pressure chamber 118. A portion of the high pressure chamber 114 proximate the middle chamber 116 has a smaller diameter than the middle chamber 116, such that a shoulder 120 is defined between the high pressure chamber 114 and the middle chamber 116. The low pressure chamber 118 has a greater diameter than the middle chamber 116. The outlet 108 is disposed on a side of the valve 100 and opens into the middle chamber 116 adjacent to the high pressure chamber 114. In this way, the outlet 108 provides a passageway between the middle chamber 116 and the exterior of the valve 100. More specifically, in this embodiment, the outlet 108 provides a passageway between the middle chamber 116 and the bypass tube 112.

The valve 100 includes a generally cylindrical two-part piston arrangement 122 (valve member). The piston arrangement 122 is arranged to slide in the hollow interior 110 of the valve. The piston arrangement 122 comprises two valve parts in the form of a smaller diameter ram 124 and a larger diameter floating cap 130. As can be seen in FIG. 2, the ram 124 comprises an elongate cylinder having a diameter sized to fit in the middle chamber 116. The ram 124 extends between a first end 126 and a second end 128. In this embodiment, the first end 126 of the ram faces the high pressure chamber 114, whilst the second end 128 of the ram faces the low pressure chamber 118. The middle chamber 116 is provided with a middle O-ring 132 which seals against a surface of the ram 124. A ram O-ring 134 is provided on the ram 124, adjacent the second end 128. Annular face seals are provided at each end of the ram 124. A first face seal 138 is provided at the first (distal) end 128 of the ram 124 and a second face seal 136 is disposed at the second (proximal) end 126 of the ram 124.

Figure 3:
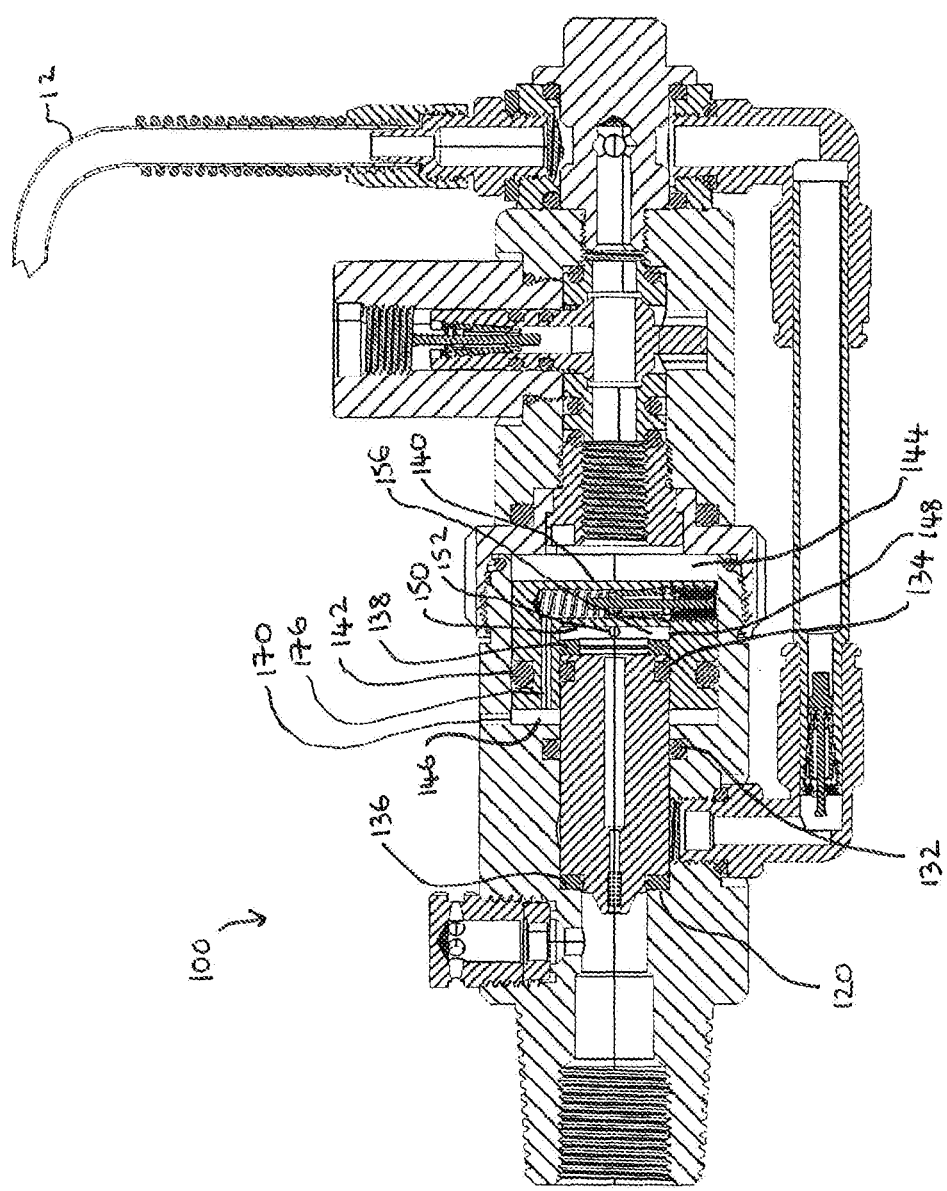
FIG. 3 is a side cross section of a preferred embodiment of a control valve for a fire suppression system in a second positon.

The cap 130 comprises a cylinder having a diameter sized to fit in the larger diameter low pressure chamber 118. A head surface 140 of the cap faces towards the detection port 106. The cap 130 is provided with a cap O-ring 142 to seal against an inside surface of the low pressure chamber 118. In this arrangement, the cap 130 and cap O-ring 142 divide the low pressure chamber 118 into a low pressure area/section/portion 144 and a vent space 146, as can be seen in FIG. 2 and FIG. 3. The low pressure portion 144 extends between the cap 130 and the detection port 106. The vent space 146 is located on the opposite side of the cap 130 to the low pressure area portion 144. The vent space 146 is defined in part by the cap 130, the inside surface of the low pressure chamber 118, and a surface of the ram 124.

A blind bore in the cap 130 opens towards the middle chamber 116 to provide a generally cylindrical socket 148, as can be seen more clearly in FIG. 2 and FIG. 3. An end surface of the socket 148 provides a seat 150. The socket 148 is sized to receive the second end 128 of the ram 124. The ram O-ring 134 seals between the ram 124 and an inside surface of the socket 148. The first face seal 138 is arranged to seal against the seat 150.

Figure 5:
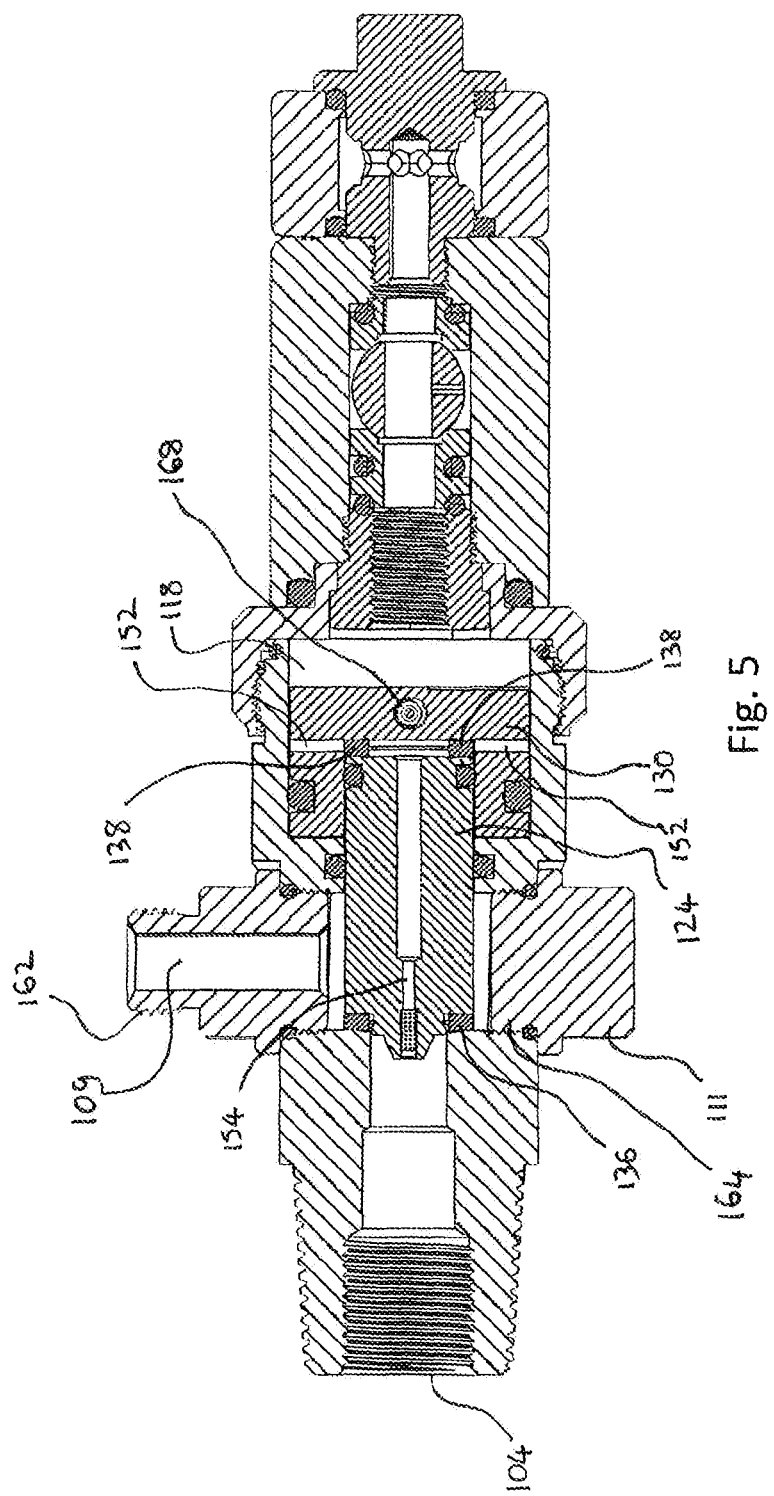
FIG. 5 is a top cross section of a preferred embodiment of a control valve for a fire suppression system in a first positon.
Figure 6:
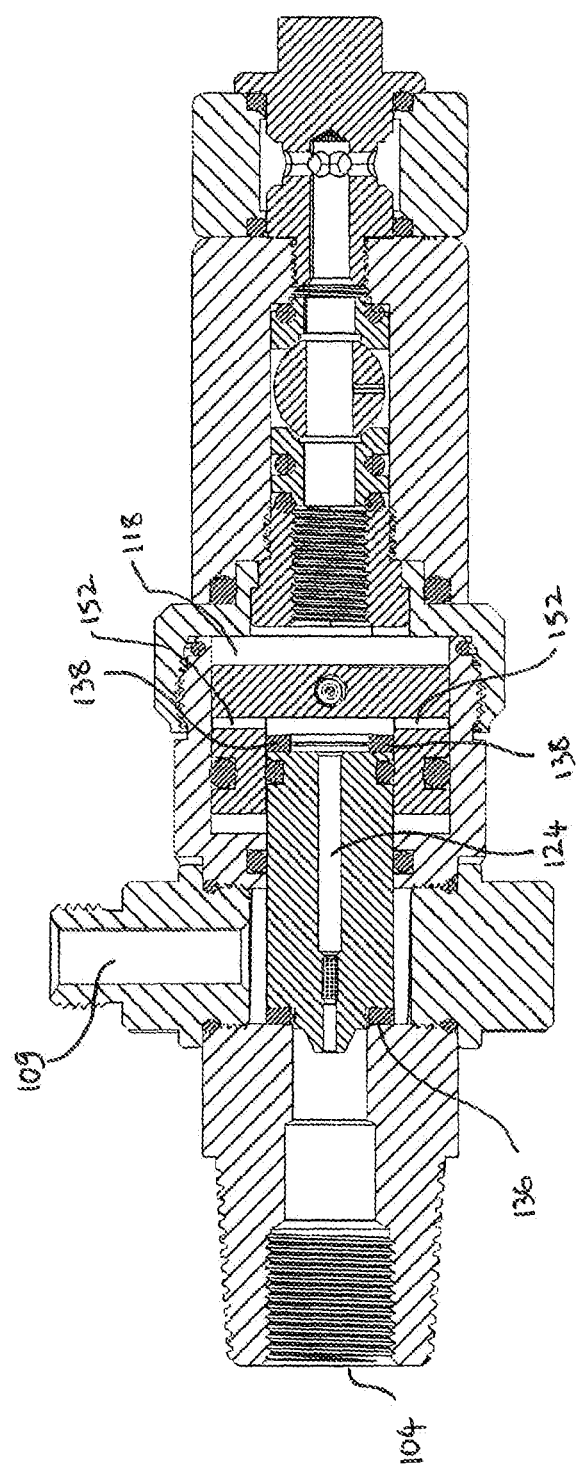
FIG. 6 is a top cross section of a preferred embodiment of a control valve for a fire suppression system in a second positon.
Figure 7:
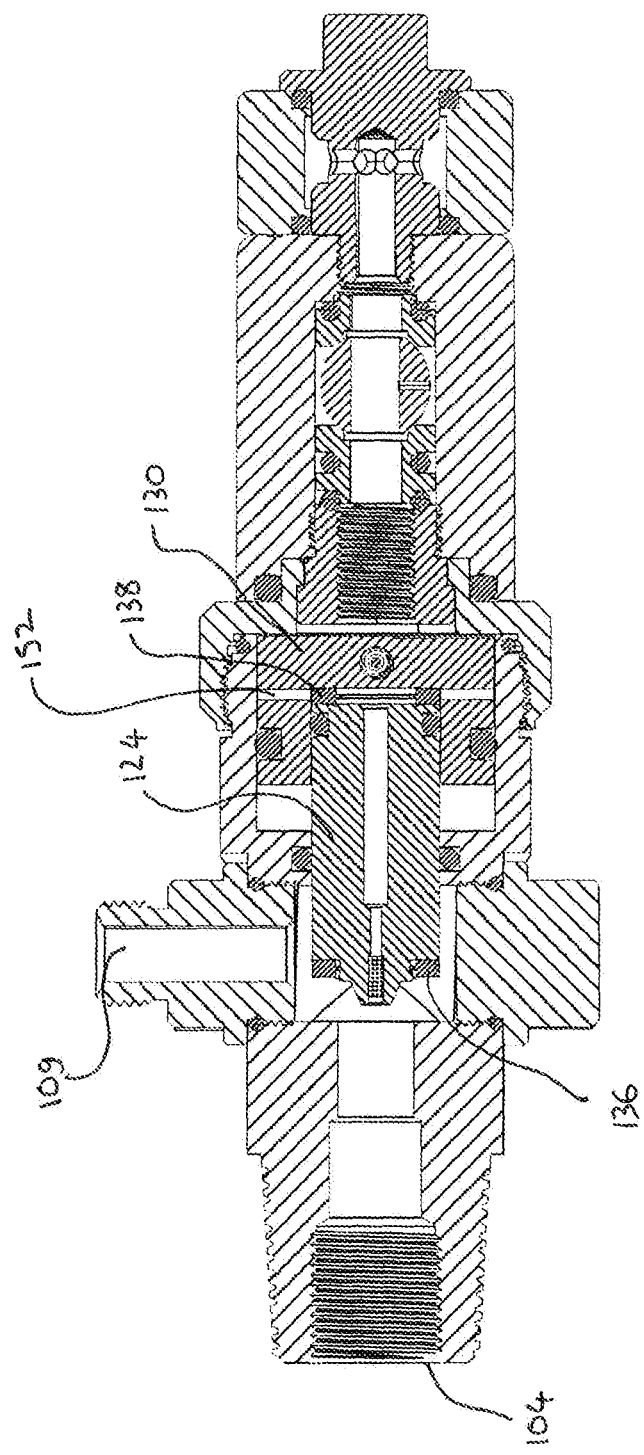
FIG. 7 is a top cross section of a preferred embodiment of a control valve for a fire suppression system in a third positon.

The cap 130 further comprises a pair of bleed apertures 152, which can be seen more clearly in FIGS. 5 to 7. Each bleed aperture 152 extends radially from the inside surface of the socket 148 to an outer surface of the cap 130. The bleed apertures 152 open into the socket 148 adjacent the seat surface 150. Each bleed aperture 152 meets the outer surface of the cap 130 between the cap O-ring 142 and the head surface 140.

A restricted passageway 154 extends longitudinally through the ram 124. At the second end 126 of the ram 124, the restricted passageway 154 opens towards the high pressure chamber 114. At the first end 128 of the ram 124, the restricted passageway 154 opens towards the cap 130, into a regulating cavity 156 enclosed by the first end 128 of the ram 124, the first face seal 138, and the socket 148. In this way, the passageway 154 provides fluid communication between the high pressure chamber 114 and the regulating cavity 156, such that the pressure in the regulating cavity 156 is largely determined by the pressure in the high pressure chamber 114. A sintered filter 158 is provided in the passageway adjacent the second end of the ram.

In general, the piston arrangement 122 is arranged to control the flow of extinguishant between the inlet 104, and the outlet 108 and detection port 106. The pressure in the low pressure reservoir 144 acts on the cap 130 to keep the valve 100 closed, whilst the pressure in the high pressure chamber 114 acts on the cap 130 and the ram 124 to open the valve. Actuation of the valve 100 is therefore determined by a pressure differential between the high pressure chamber 114 and low pressure reservoir 144, as will be described in more detail below.

FIG. 2 shows the valve 100 in a first, closed configuration. This arrangement corresponds to a primed or charged fire suppression system, in which the inlet 104 is connected to a pressurised cylinder 14 and the detection port 106 is connected to pressurised detection tubing 12. In this configuration, the head surface 140 of the cap 130 in the low pressure reservoir 144 is exposed to the relatively low pressure in the low pressure reservoir 144 and detection tubing 12. This pressure urges the cap 130 towards the middle chamber 116. Conversely, the seat 150 of the socket 148 is exposed to the higher pressure in the regulating cavity 156, via the restricted passageway 154. This higher pressure urges the cap 130 away from the middle chamber 116, towards the detection port 106. The position of the cap 130 within the low pressure chamber 118 is therefore determined by these opposing pressures.

The head surface 140 has a considerably larger surface area than the seat 150. Accordingly, for a given pressure, the force exerted on the cap 130 by pressure acting on the head surface 140 will be greater than the force exerted by the same pressure acting on the seat 150. The head surface 140 and seat 150 are sized such that, in this primed configuration, the pressure in the low pressure reservoir 144 exerts a greater force on the cap 130 than the force exerted by the higher pressure acting on the seat 150. As a result, there is a net force acting to urge the cap 130 away from the detection port 106, towards the middle chamber 116.

The cap 130 is therefore urged towards the ram 124, such that the seat 150 abuts the first end 128 of the ram 124. In this way, the ram 124 is urged towards the high pressure chamber 114, such that the second end 126 of the ram 124 abuts the shoulder 120. The second face seal 136 thus seals between the second end 126 of the ram 124 and the shoulder 120. In this way, communication between the high pressure chamber 114 and the middle chamber 116 is closed. The outlet 108 is therefore also isolated from the high pressure chamber 114, as can be seen in FIG. 2. In this way, pressurised extinghuishant is prevented from passing through the valve 100.

In this arrangement, the restricted passageway 154 through the ram 124 is closed at the first end 128 of the ram 124, since the first face seal 138 is pressed against the seat 150. As can be seen in FIG. 5, the first face seal 138 also blocks fluid communication between the cavity 156 and the bleed apertures 152.

In use, the valve 100 is arranged to maintain pressure in the detection tubing 12 in the absence of fire. When the detection port 106 is connected to a length of detection tubing 12, the pressure in the detection tubing 12 may fall gradually as described above, for example as a result of leakage through the walls of the tubing. Accordingly, the pressure acting on the head surface 140 in the low pressure reservoir 144 is therefore reduced, such that the force with which the cap 130 is driven on to the ram 124 is reduced. The force exerted on the cap 130 by the high pressure in the regulating cavity 156 may now be sufficient to urge the cap 130 away from the first end 128 of the ram 124, towards the detection port 106. Accordingly, as can be seen in FIG. 3, the cap 130 moves away from the ram and the cavity 156 enlarges.

The pressure in the cavity 156 is fed via the restricted passageway 154, and so does not change substantially as the cavity 156 expands. Each end 126, 128 of the ram 124 is therefore subject to the same pressure. However, as can be seen in FIGS. 2 and 3, the area exposed to this pressure at the second end 126 of the ram 124 is smaller than the area exposed at the first end 128 of the ram. The force exerted on the first end 128 of the ram 124 therefore holds the ram in the same position as in the closed configuration shown in FIG. 2. In this way, a seal is maintained between the high pressure chamber 114 and the middle chamber 116. In effect, the pressure in the cavity 156 allows the cap 130 to float on the second end 128 of the ram 124, whilst maintaining sufficient force on the ram 124 to keep the high pressure chamber 114 sealed by the second face seal 136. It will be appreciated that in this arrangement, only the face seals 136, 138 are subject to the higher pressure in the high pressure chamber 114 and cavity 156, whilst the middle O-ring 132 and cap O-ring 142 are subject to lower pressures.

Movement of the cap 130 away from the first end 128 of the ram 124 exposes open ends of the bleed apertures 152 in the socket 148, as can be seen most clearly in FIGS. 3 and 6. The bleed apertures 152 are therefore in fluid communication with the cavity 156. Where the bleed apertures 152 meet the outer surface of the cap 130, clearance between the cap and the inside surface of the low pressure chamber 118 allows gas to pass into the low pressure reservoir 144. In this way, movement of the cap 130 opens a passageway between the cavity 156 and the low pressure reservoir 144, such that the higher pressure in the cavity 156 drives gas into the low pressure reservoir 144, thereby restoring the pressure in the detection tubing 12.

The cap O-ring 142 prevents gas from escaping past the cap 130 into the vent space 146. As pressure in the low pressure reservoir 144 and detection tubing 12 subsequently increases, the cap 130 is urged back towards the ram 124, closing the bleed apertures 152 and preventing further gas flow into the detection tubing 12. The cap 130 therefore functions as a regulator to replenish and maintain pressure in the detection tubing 12. Pressure in the detection tubing 12 is thus held relatively constant, at a lower pressure than that supplied to the valve inlet 104. Note that in this arrangement, the cap O-ring 142 is exposed only to the relatively lower pressure in the low pressure reservoir 144.

Advantageously, the valve 100 is arranged to prevent surges of pressure into the detection tubing 12. Although the bleed apertures 152 are shown fully open in FIG. 6, it will be appreciated that initially, as the cap 130 moves away from the first end 128 of the ram 124, the ends of the bleed apertures 152 will be exposed only partially. In this way, the path through the bleed apertures 152 is partly restricted by the first face seal 138, such that gas flow into the low pressure reservoir 144 and detection tubing 12 is gradual.

Additionally, the sintered filter 158 provided in the restricted aperture 154 is arranged, in use, to smooth the flow of extinguishant through the restricted aperture. In particular, the filter 158 is arranged to prevent flow of liquid extinguishant through the restricted aperture 154, should any liquid enter the valve 100 from the pressurised cylinder 14. In this way, liquefied gas is prevented from passing through the valve 100, such that the risk of large pressure changes in the low pressure reservoir 144 is reduced.

Figure 4:
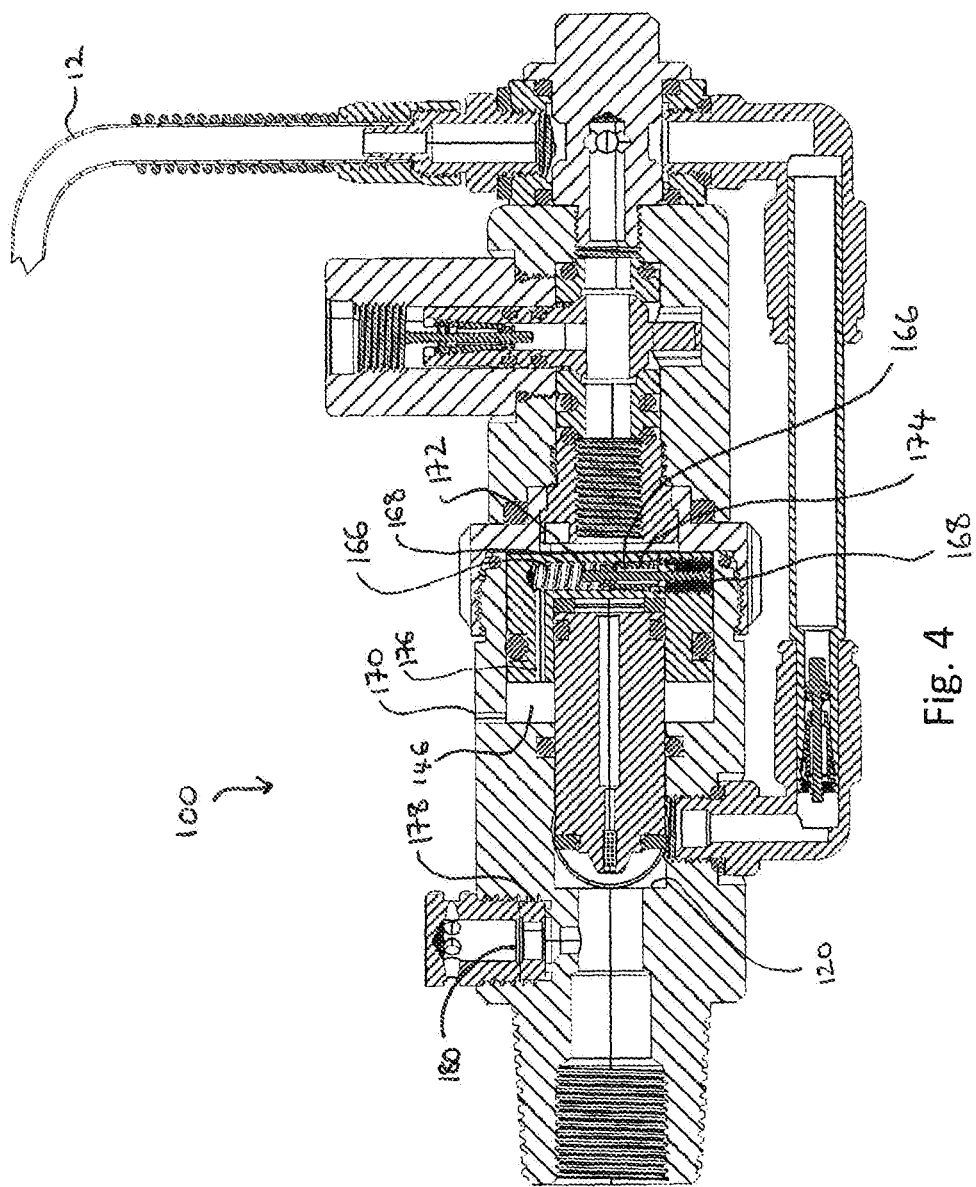
FIG. 4 is a side cross section of a preferred embodiment of a control valve for a fire suppression system in a third positon.

In the event of a catastrophic drop in pressure in the detection tubing 12, as a result of rupture of the tubing by heat, the valve 100 is arranged to open a passageway between the inlet 104 and the outlet 108, such that extinguishant can be released. This open configuration is shown in FIGS. 4 and 7. Loss of pressure in the detection tubing 12 substantially reduces the pressure acting on the head surface 140, such that the cap 130 moves fully towards the detection port 106, driven by the higher pressure in the cavity 156. Pressure in the cavity 156 falls as the cavity expands, since any gas fed through the restricted aperture 154 leaks into the low pressure reservoir 144 via the bleed apertures 152 and escapes through the ruptured detection tubing 12. Consequently, the ram 124 is driven towards the cap 130 by the pressure in the high pressure chamber 114 acting on the first end 126 of the ram. In this way, the second face seal 136 is released from the shoulder 120, such that a passageway is opened between the high pressure chamber 114 and the outlet 108, allowing flow of extinguishant between the inlet and the outlet. Extinguishant is thereby discharged from the cylinder 14 through the outlet 108.

In the open configuration, some extinguishant is also discharged through the detection tubing 12 via the restricted aperture 154 and bleed apertures 152. In this way, extinguishant may be released at the site of rupture of the detection tubing 12. Note that the sintered filter 158 restricts the flow of extinguishant into the cavity 156, such that pressure in the cavity does not increase sufficiently to return the valve 100 to the closed position. Since any extinguishant in the cavity 156 can escape via the bleed apertures 152, the pressure acting on the first end 126 of the ram 124 remains higher than the pressure acting on the first end 128 of the ram, and so the valve 100 remains in the open configuration. With this arrangement, the valve remains in the open configuration until the supply of extinguishant is exhausted.

In this embodiment, the outlet 108 is connected to the detection tubing 12 via the bypass tube 112. In this way, extinguishant may be discharged directly through the detection tubing 12 and released at the rupture site, bypassing the piston arrangement 122.

As can be seen in FIGS. 1 to 4, the bypass tube 112 extends between the outlet 108 and the isolation valve 10. In this way the bypass tube 112 provides a passageway between the middle chamber 116 and the detection tubing 12. A non-return valve 160 is provided in the bypass tube 112 to prevent flow of extinguishant from the isolation valve 10 towards the middle chamber 116. In this first embodiment, the non-return valve 160 comprises a Schrader valve. The non-return valve 160 prevents accumulation of pressure in the middle chamber 116 when the valve 100 is in a closed configuration, whilst allowing flow of extinguishant into the isolation valve 10 when the valve 100 is in the open configuration.

As can be seen in FIG. 1 and FIGS. 5 to 7, in this first embodiment the valve 100 additionally comprises two auxiliary outlets 162, 164 or 109. In a similar manner to the outlet 108 described above, each auxiliary outlet 162, 164 (109) provides a passageway between the middle chamber 116 and the exterior of the valve 100. When the valve 100 is in the open configuration therefore, extinguishant may be released through any of the outlets 108, 162, 164, 109. With this arrangement, the valve 100 may optionally be connected to more than one fire suppression system. Of course, where fewer outlets are required, any outlet may be blocked or closed as needed. In some embodiments, the valve 100 may have more, or fewer outlets.

In other embodiments, the or each outlet 108, 162, 164, 109 may additionally or alternatively be connected to another fire suppression system or discharge system for controlling the distribution of extinguishant in the event of a fire. For instance, each outlet 108, 162, 164, 109 may be connected to a network of tubing for delivering extinguishant to a number of locations.

When the valve 100 is in the open configuration, liquefied extinguishant may flow from the outlets 108, 162, 164, 109. Subsequent expansion of this liquefied gas may result in excessive pressure in downstream components through which extinguishant is delivered, such as the tubing 12. Accordingly, in some embodiments, the or each outlet 108, 162, 164, 109 may be provided with a sintered filter, to regulate the flow of extinguishant and limit release of liquefied gas through the outlet.

In this first embodiment, the valve 100 is arranged to release excess pressure. In particular, the valve 100 is arranged to vent excess pressure, for safety, and/or to prevent damage to parts of the valve or fire suppression system. For instance, excess pressure could cause rupture of the detection tubing 12 in the absence of fire, leading to loss of extinguishant which may render a fire suppression system ineffective. The valve 100 may be subject to such excessive pressures if connected to a supply of extinguishant at an inappropriate pressure, or as a result of a change in ambient temperature. For example, in the event of an increase in ambient temperature surrounding the cylinder, pressure in the cylinder will increase. Subsequently, pressure in the low pressure reservoir 144 and detection tubing 12 may increase as extinguishant feeds through the valve 100, via the restricted passageway 154 and bleed apertures 152.

Accordingly, in this embodiment, the valve 100 includes a pressure relief mechanism 166 comprising a relief bore 168, relief vent 170 and a relief valve 172. As can be seen in FIGS. 2 to 4, a first portion 174 of the relief bore 168 extends radially into the cap 130, from an opening in the outer surface of the cap 130 adjacent the head surface 140. Clearance between the cap 130 and the inside surface of the low pressure chamber 118 provides fluid communication between the relief bore 168 and the low pressure reservoir 144. A second portion 176 of the relief bore 168 meets the first portion 174 adjacent a closed end of the first portion 174. The second portion 176 of the relief bore 168 extends between the first portion 174 and the vent space 146. The second portion 176 extends generally perpendicular to the first portion 174. In this way, the first 174 and second 176 portions of the relief bore 168 form a continuous passageway through the cap 130. The relief bore 168 therefore provides a pathway between the low pressure reservoir 144 and the vent space 146, bypassing the cap O-ring seal 142. The relief vent 170 comprises an aperture which extends through the housing between the vent space 146 and the exterior of the valve 100.

The relief valve 172 is housed in the first portion 174 of the relief bore 168. The relief valve 172 is arranged to open in response to excess pressure in the low pressure reservoir 144. In this embodiment, the relief valve 172 comprises a Schrader valve. In the event that pressure in the low pressure reservoir 144 and detection tubing 12 exceeds a threshold level, the relief valve 172 will open, allowing extinguishant to pass through the relief bore 168 into the vent space 146. Extinguishant may then escape to the surroundings via the relief vent 170. In this way, excess pressure may be vented from the valve 100.

It will be appreciated that, since excess pressure in the high pressure chamber 114 can be fed into the low pressure reservoir 144 via the restricted passageway 154 and bleed apertures 152, the pressure relief mechanism 166 can vent excess pressure from any source of compressed extinguishant connected to the valve 100.

Advantageously, the arrangement of parts of the pressure relief mechanism 166 within the cap 130 provides a more compact valve. The relief vent 170 also serves to release any pressure which may leak into the vent space 146 past the middle O-ring 132 or cap O-ring 142.

In this first embodiment, the valve 100 further comprises a fail-safe outlet 178 arranged to release excess pressure in the event of failure of the pressure relief mechanism 166 described above and/or (undesired) excess pressure within the high pressure reservoir/chamber. The fail-safe outlet 178 comprises a blocked passageway extending between the high pressure chamber 114 and the exterior of the valve, as seen in FIGS. 2 to 4. The fail-safe outlet 178 is blocked by a rupture disk or burst disk 180. The burst disk 180 is arranged to rupture when exposed to excess pressure in the high pressure chamber 114. Ordinarily, excess pressure in the high pressure chamber 114 would be fed into the low pressure chamber 118 and vented via the pressure relief mechanism 166 as described above. However, in the event of failure of these parts of the valve 100, for example if moving components became jammed, pressure may be released by rupture of the burst disk 180. Accordingly, in this embodiment, the burst disk 180 is arranged to rupture only when pressure in the high pressure chamber 114 reaches a threshold value considerably higher than would occur during normal operation of the valve 100.

FIG. 8 to FIG. 10 and FIG. 11 to FIG. 13 show sequentially the position of the various valve parts and face seals in the three positions.

Figure 8:
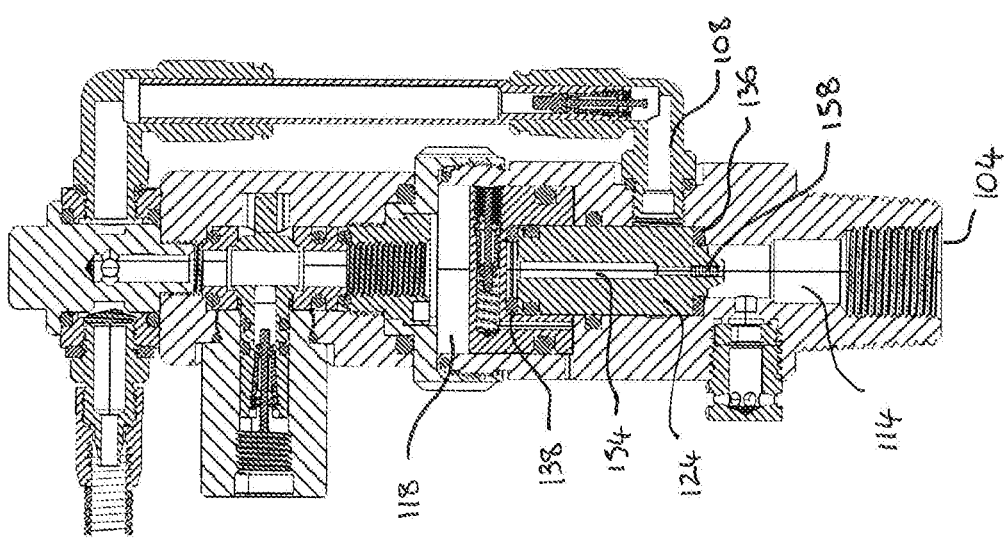
Figure 11:
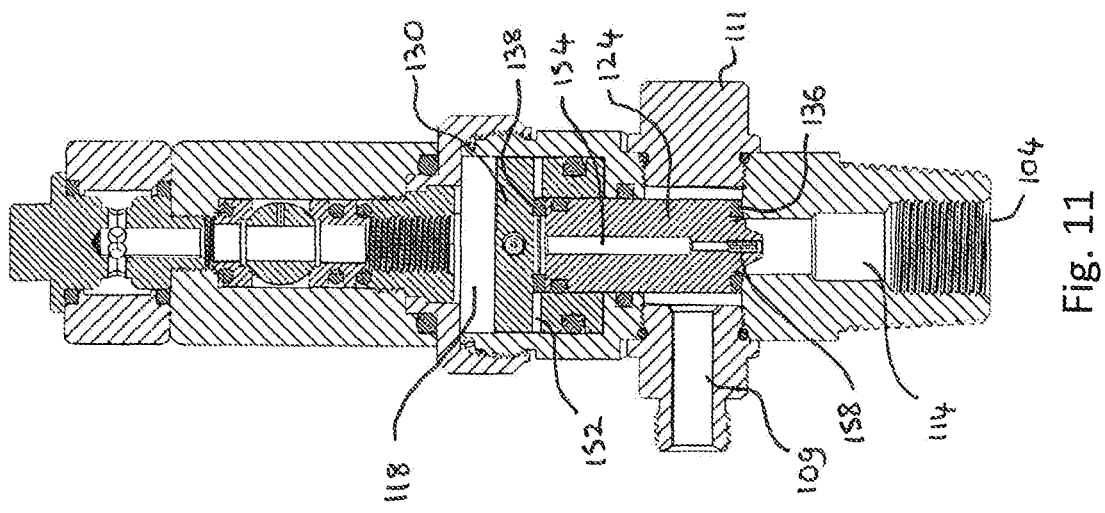

As shown in FIG. 8 and FIG. 11, in the first position, the high pressure chamber 114 is sealed such that the high pressure extinguishant is contained and cannot flow towards either of the outlets 108, 109 or into the low pressure chamber 118. In particular, the second face seal 136 between the end face of the first valve part 124 and the annular planar sealing surface on the shoulder 120 around the high pressure chamber 114 prevents any flow from the high pressure chamber to the high pressure outlets 108, 109. The first face seal 138 is also in a sealing position and shrouds or covers/closes the bleed aperture 152 providing a passageway to the low pressure chamber 118. Accordingly the first face seal 138 prevent any fluid (gas/extinguishant) flowing from the high pressure chamber 114 to the low pressure chamber 118.

Figure 9:
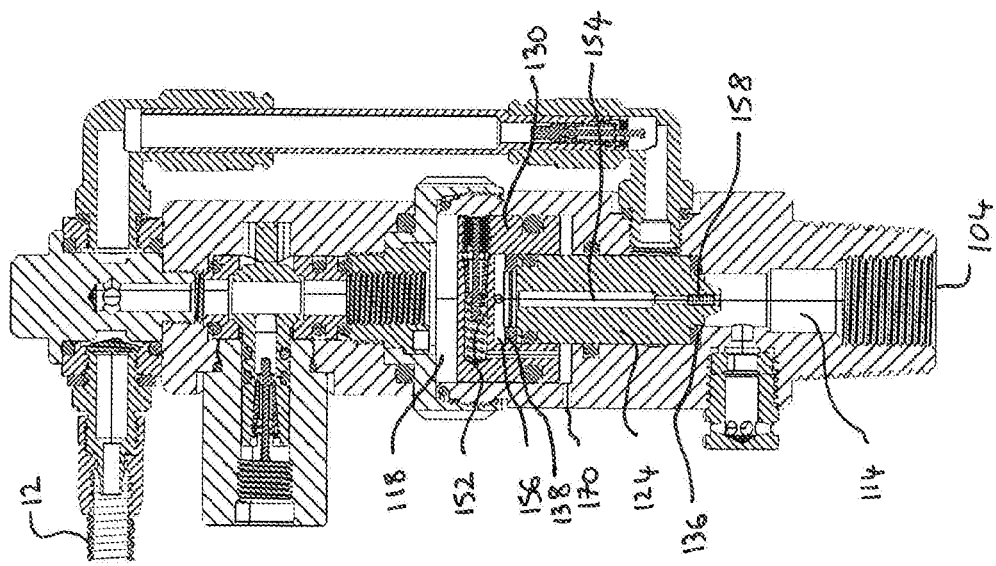
Figure 12:
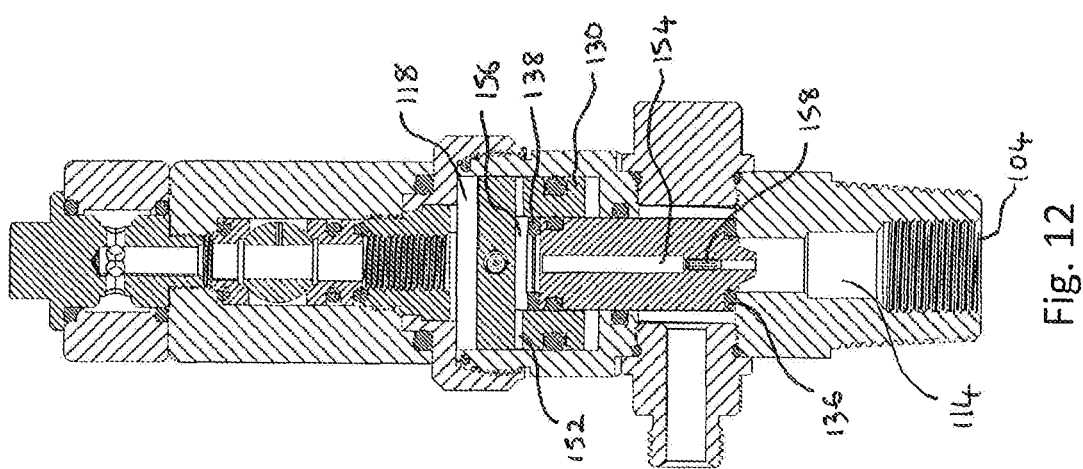

As shown in FIG. 9 and FIG. 12, in the second position, the first face seal 138 is located in an unsealed position. This may be caused by a reduction in pressure within the low pressure chamber 118. This reduces (changes/reverses) the force differential acting on the opposing faces of the floating cap 130 such that the floating cap 130 is pushed by the high pressure side towards the low pressure side. This force differential may be relatively small and it is important that the floating cap 130 is freely movable (moves smoothly) and is not inadvertently stuck in position or needs an undue force/pressure differential to overcome the resistive movement force. In the present invention, a face seal 138 is used rather than an O-ring seal which may tend to swell with continued exposure within the fire suppression system.

A swollen O-ring may then significantly increase the resistive movement force required between the two valve parts and may prevent effective functioning of the valve. An O-ring located within an annular space defined between an inner surface of an outer valve part and an outer surface of an inner valve part could unknowingly prevent or risk the correct and sensitive functioning of the fire suppression system. Accordingly, if the O-ring is swollen then the O-ring will expand within the fixed annular gap between the two valve parts and result in an increased resistive movement force which may then prevent the valve parts moving at all or requiring a greater pressure differential before functioning.

The present invention utilises a face seal 138 between the opposing sealing faces which move directly away from each other such that a swollen seal located therebetween will not cause any undue resistive forces which may lead to the valve not functioning. In particular, the present invention is sensitive and enables a relatively small reduction in pressure within the low pressure reservoir to be replenished from the high pressure chamber. Furthermore, a significantly swollen and permanently stuck O-ring could prevent the low pressure reservoir being replenished and could even lead to the valve malfunctioning and/or not being fully operable when required.

Accordingly, in this second position, the floating cap 130 smoothly moves to an unsealed position whereby the bleed apertures 152 and associated passageways are exposed. The gas is then able to flow through the sintered filter 158 through the restricted passageway 154 and into the bleed apertures 152. From the exit regions of the bleed passageways the additional gas will start to increase the pressure within the low pressure chamber 118 and will reset the pressure such that the floating cap 130 is forced back into the first position. This action is repeatable such that the high pressure chamber is able to continually top up the low pressure chamber to ensure the correct functioning of the fire suppression system and specifically the detection tube 12.

Figure 10:
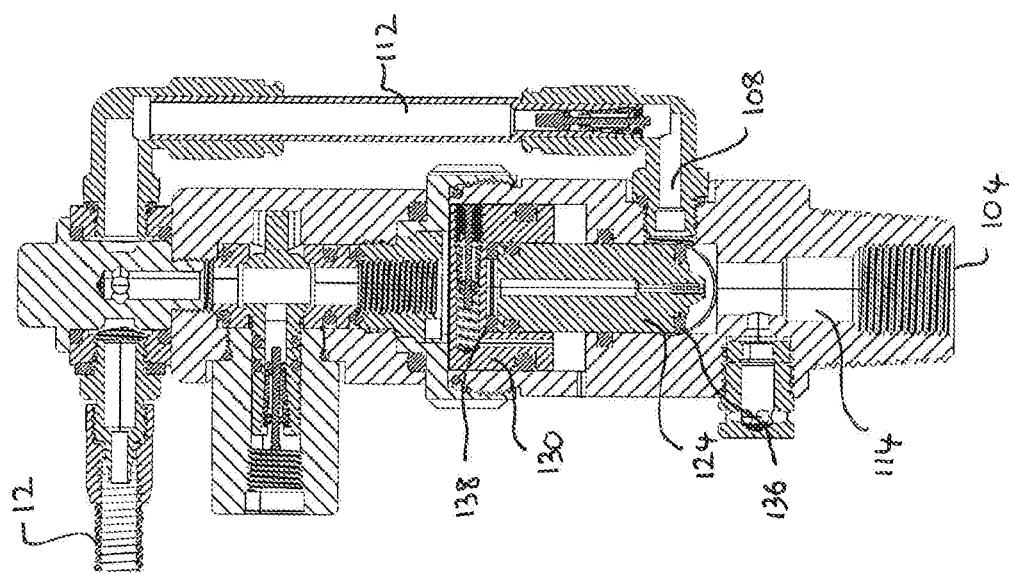
FIG. 8 to FIG. 10 is a side cross sectional sequence showing the valve moving between a first position, second position and a third position.
Figure 13:
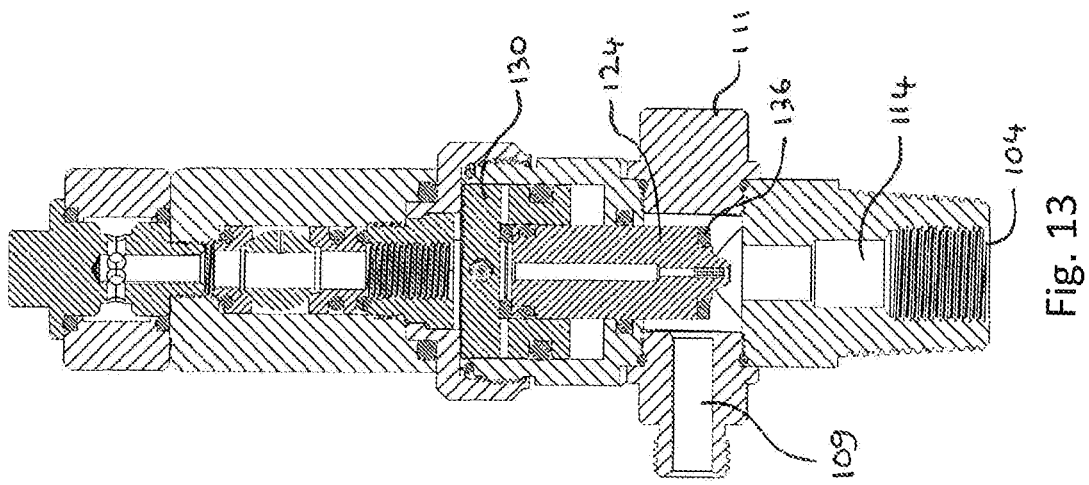
FIG. 11 to FIG. 13 is a top cross sectional sequence showing the valve moving between a first position, second position and a third position.

As shown in FIG. 10 and FIG. 13, in the third position, the detection tube 12 has ruptured such that there has been a sudden and significant reduction in pressure within the low pressure chamber 118. In this third position, the floating cap 130 and the ram 124 have both moved within the valve. In particular, the second face seal 136 mounted on the end face of the ram 124, has moved to an unsealed position. In this unsealed position, there is unrestricted communication between the high pressure chamber 114/high pressure inlet 104 and the high pressure outlet(s) 108, 109. Accordingly, the fire extinguishant is free to discharge through these outlet(s) 108, 109.

The extinguishant may be released though the outlet 108 and along the bypass conduit 112 and out through the rupture of the detection tube which will have instigated the initial loss of pressure in the low pressure chamber 118. Optionally, in addition or alternatively, the fire extinguishant may also be released through the auxiliary outlet 109 which may be connected to a conduit with one or more diffuser heads through which the extinguishant will be released at fixed locations. If not required, the auxiliary outlet may be sealed by a cap 111.

Figure 14:
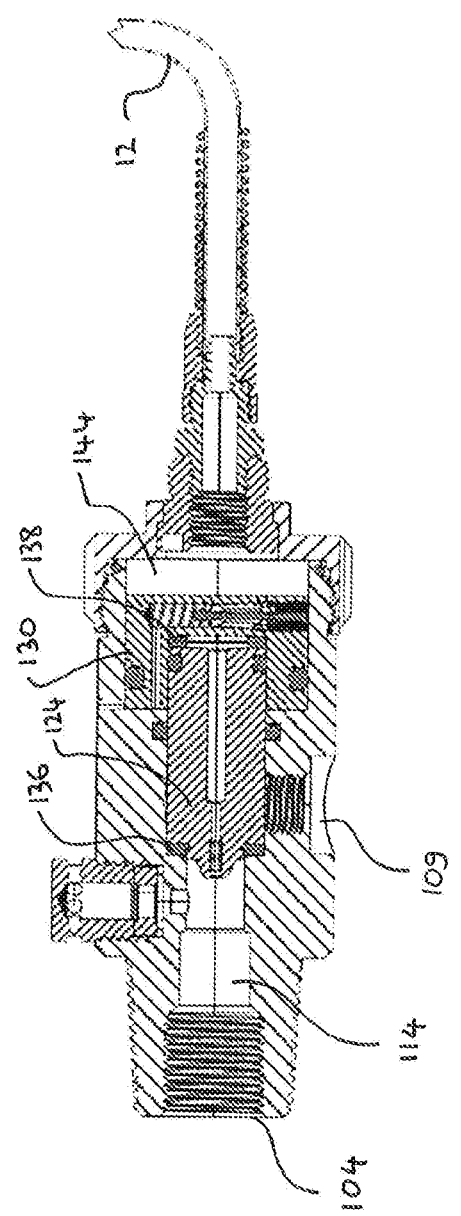
FIG. 14 is a side cross section of another embodiment of a control valve for a fire suppression system in a first positon.

FIG. 14 shows another embodiment of a valve 100 according to the present invention which does not include an isolation valve 10 as included in the previous embodiment. The operation of the valve is the same as described above although it will be appreciated that this valve is more compact than that previously described.

Overall, the preferred embodiment of the present invention essentially comprises three brass elements/components, two face seals with three O-rings and a Schrader valve. The present invention provides the face seal(s) to remove the swelling problem mentioned previously and also provides the simple 4 to 1 reduction regulator without the need for a spring together with the 5 micron sintered filter which regulates the Co2 gas flow so the phase change of 536 to 1 expansion from liquid to gaseous will not cause the valve to close during discharge even if the detection tube burst is up to 100 meters down the detection tube (which causes a back pressure because of lineal flow resistance).

The invention claimed is:

1. A valve having a body with a high pressure chamber with a high pressure inlet port, a high pressure outlet port, a valve member movable within the body for opening and closing communication between the inlet and outlet ports and a low pressure chamber with a low pressure port for connection to a low pressure reservoir, wherein the pressure in the low pressure reservoir determines whether communication is opened between the inlet and outlet ports and wherein the valve member has two valve parts which are movable relative to one another, the first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which:

the valve comprises a face seal located between the high pressure chamber and the low pressure reservoir and, in which, in the first positon, the face seal is arranged to seal the low pressure reservoir from the high pressure chamber and, in the second position, the face seal is in an unsealed position and enables communication between the high pressure chamber and the low pressure reservoir.

2. A valve according to claim 1 in which the face seal is mounted on an end face of the first valve part.

3. A valve according to claim 1 in which the face seal comprises a first face seal mounted on a first end face of the first valve part and the valve comprises a second face seal mounted on a second end face of the first valve part.

4. A valve according to claim 1 in which the face seal is arranged to create a seal between two sealing surfaces and wherein the sealing surfaces are arranged to move towards each other and away from each other to open and close a pathway defined therebetween.

5. A valve according to claim 4 in which the separation distance between the two sealing surfaces is arranged to increase to create an open passageway and the sealing surfaces are arranged to move towards each other to compress the face seal therebetween to close the passageway.

6. A valve according to claim 1 in which the face seal is located between a face of the first valve part and a face of the second valve part, and wherein sealing faces of the first valve part and the second valve part are movable away from and towards each other between an unsealed position and a sealed position.

7. A valve according to claim 1 in which:
in the third position, the face seal prevents communication between the high pressure chamber and the low pressure chamber.

8. A valve according to claim 1 in which the face seal seals an entry to the low pressure reservoir in the first position and the third position and the face seal unseals the entry to the low pressure reservoir from the high pressure chamber in the second position.

9. A valve according to claim 1 in which the face seal is located on a first distal end face of the first valve part and comprises a planar annular seal member.

10. A valve according to claim 1 in which the valve comprises a second face seal located on the first valve part and wherein, in the first position, the second face seal is located between a second end face of the first valve part and a face located adjacent to the high pressure chamber and prevents fluid flow between the inlet port and the outlet port.

11. A valve according to claim 1 in which the valve comprises a second face seal located on the first valve part and wherein:
in the first position, the second face seal prevents communication between the inlet port and the outlet port,
in the second position, the second face seal prevents communication between the inlet port and the outlet port, and in the third position, the second face seal is in an unsealed position and allows communication between the inlet port and the outlet port.

12. A valve according to claim 10 in which the second face seal comprises a planar annular seal member.

13. A valve according to claim 1 in which the face seal comprises an annular sealing face which is located around a regulating chamber and, in which, in the second positon, the face seal is located remote from a first face of the second valve part and exposes a bleed passageway between the regulating chamber and the low pressure reservoir which enables restricted flow from the high pressure chamber to the low pressure reservoir.

14. A valve according to claim 13 in which the second valve part comprises the bleed passageway to enable communication between the high pressure chamber and the low pressure reservoir in the second position and the face seal seals an entry to the bleed passageway in the first position and the face seal unseals the entry to the bleed passageway in the second position.

15. A valve according to claim 1 in which the first valve part comprises a restricted passageway therethrough and wherein the first valve part comprises a filter member located within the restricted passageway and, in which, the filter member comprises a sintered filter.

16. A valve according to claim 1 in which the valve comprises a pressure relief system to release excess pressure from the low pressure reservoir, the pressure relief system comprising a passageway which provides communication between the low pressure reservoir and the external atmosphere and the passageway is defined in the second valve part.

17. A valve according to claim 1 in which the valve comprises a bypass conduit which extends between the high pressure outlet port and the low pressure port.

18. A valve according to claim 1 in which the second valve part of the valve member has a blind bore, and an end of the first valve part slides in the bore and, in which, a gas-tight seal exists in the bore when the first and second valve parts are in the first position and, in the second position, the second valve part moves away from a distal end of the first valve part in the bore to allow a restricted passageway to open between the high pressure inlet port and the low pressure chamber.

19. A fire suppression system comprising a cylinder containing a high pressure extinguishant, a detection tube defining a low pressure reservoir and a control valve, the control valve having a body with a high pressure chamber with a high pressure inlet port engaged to the cylinder, a high pressure outlet port, a valve member movable within the body for opening and closing communication between the inlet and outlet ports and a low pressure chamber with a low pressure port engaged to the detection tube, wherein the pressure in the low pressure reservoir determines whether communication is opened between the inlet and outlet ports and wherein the valve member has two valve parts which are movable relative to one another, first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which:

the valve comprises a face seal located between the high pressure chamber and the low pressure reservoir and, in which, in the first positon, the face seal is arranged to seal the low pressure reservoir from the high pressure chamber and, in the second position, the face seal is in an unsealed position and enables communication between the high pressure chamber and the low pressure reservoir.

20. A method of actuating a fire suppression system wherein the fire suppression system comprises a cylinder containing a high pressure extinguishant, a detection tube defining a low pressure reservoir and a control valve, the valve having a body with a high pressure chamber with a high pressure inlet port, a high pressure outlet port, a valve member movable within the body for opening and closing communication between the inlet and outlet ports and a low pressure chamber with a low pressure port for connection to the low pressure reservoir, wherein the pressure in the low pressure reservoir determines whether communication is opened between the inlet and outlet ports and wherein the valve member has two valve parts which are movable relative to one another, the first valve part being adapted to open and close communication between the inlet and outlet ports and the second valve part being exposed to pressure in the low pressure chamber, the first and second valve parts being relatively movable between a first position where there is no communication between the high pressure inlet port and the low pressure reservoir, a second position where there is a restricted communication between the high pressure inlet port and the low pressure reservoir, and a third position where communication is opened between the inlet and outlet ports and in which the method comprises:

providing a face seal for sealing the high pressure chamber from the low pressure chamber and, in the first positon, sealing the low pressure reservoir from the high pressure chamber using the face seal and, moving the valve parts to the second position to move the face seal to an unsealed position to enable communication between the high pressure chamber and the low pressure reservoir.

* * * * *